(12) United States Patent
Fuchiwaki (10) Patent No.: US 7,724,620 B2
(45) Date of Patent: May 25, 2010

(54) INFORMATION RECORDING/REPRODUCING APPARATUS AND A DATA REPRODUCING METHOD THEREOF, AS WELL AS AN OPTICAL DISK THEREOF

(75) Inventor: Atsushi Fuchiwaki, Yokohama (JP)

(73) Assignee: Hitachi-LG Data Storage, Inc., Tokyo (JP)

(*) Notice: Subject to any disclaimer, the term of this patent is extended or adjusted under 35 U.S.C. 154(b) by 823 days.

(21) Appl. No.: 11/521,732

(22) Filed: Sep. 14, 2006

(65) Prior Publication Data

US 2007/0064577 A1    Mar. 22, 2007

(30) Foreign Application Priority Data

Sep. 15, 2005 (JP) .............. 2005-268138

(51) Int. Cl.
G11B 20/12 (2006.01)
(52) U.S. Cl. ............... 369/53.17; 369/47.14; 369/59.25
(58) Field of Classification Search .............. 369/47.14, 369/53.17, 59.25
See application file for complete search history.

(56) References Cited

U.S. PATENT DOCUMENTS

| | | | |
|---|---|---|---|
| 6,373,803 B2 * | 4/2002 | Ando et al. ............... | 369/59.25 |
| 6,760,288 B2 * | 7/2004 | Ijtsma et al. .............. | 369/53.18 |
| 7,027,373 B2 * | 4/2006 | Ueda et al. ............... | 369/53.15 |
| 7,133,339 B2 | 11/2006 | Sasaki | |
| 7,400,563 B2 | 7/2008 | Hwang et al. | |
| 2001/0026511 A1 * | 10/2001 | Ueda et al. ............... | 369/47.14 |
| 2005/0270944 A1 * | 12/2005 | Yoshida et al. ........... | 369/53.17 |
| 2008/0117777 A1 * | 5/2008 | Hwang et al. ............ | 369/53.17 |
| 2009/0022020 A1 * | 1/2009 | Nakamura ............... | 369/47.14 |

FOREIGN PATENT DOCUMENTS

CN    1392558    1/2003

(Continued)

OTHER PUBLICATIONS

Japan Patent Office (JPO) office action for JPO patent application JP2005-268138 (Feb. 4, 2009).

(Continued)

*Primary Examiner*—Wayne R Young
*Assistant Examiner*—Brenda Bernardi
(74) *Attorney, Agent, or Firm*—Townsend and Townsend and Crew LLP (57) ABSTRACT

A data reproducing method for reproducing data, upon an optical disk of rewritable type, having an alternated block management area, a data area, on which recording/reproducing of the information is conducted by a unit of block, and an alternation area, on which recording/reproducing of information including a defective sector therein is conducted by the unit of block, through an information recording/reproducing apparatus enabling to execute Read Modify Write operation thereon, comprising the following steps of, in case where said alternation areas are in a plural number thereof when executing Read Modify Write operation onto said optical disk of rewritable type: executing reproducing on said data area including the defective sector therein, by only one (1) time; executing reproducing on said alternation area, thereafter, so as to hold data reproduced; and thereby reproducing the data. With this, it is possible to increase speed (i.e., speedup) in the reproducing time thereof, in total, but without necessary of reproducing operation upon the data area by a plural number of times.

5 Claims, 8 Drawing Sheets

FOREIGN PATENT DOCUMENTS

| | | |
|---|---|---|
| JP | 63-316368 A | 12/1988 |
| JP | 04-178976 A | 6/1992 |
| JP | 08-138323 A | 5/1996 |
| JP | 11-066751 A | 3/1999 |
| JP | 2003-288758 A | 10/2003 |
| JP | 2004-171603 A | 6/2004 |
| JP | 2004-303345 A | 10/2004 |
| JP | 2005-129168 A | 5/2005 |
| JP | 2005-196903 A | 7/2005 |
| WO | WO2004/036561 A1 | 4/2004 |

OTHER PUBLICATIONS

China State Intellectual Property Office (SIPO) office action for SIPO patent application CN CN200610153447.8 (Dec. 19, 2008).

Japan Patent Office (JPO) office action for JPO patent application JP2005-268138 (Nov. 4, 2008).

\* cited by examiner

INFORMATION RECORDING/REPRODUCING APPARATUS AND A DATA REPRODUCING METHOD THEREOF, AS WELL AS AN OPTICAL DISK THEREOF

BACKGROUND OF THE INVENTION

The present invention relates to an information recording/reproducing apparatus and a data reproducing method thereof, for enabling an alternation process of a defective sector in the recording operation, which is called by "read modify write", in particular, within recording onto an information recording medium, which enables recording with high density, such as, DVD, etc., as well as, an optical disk thereof, and in particular, it relates to a technology for achieving a reproducing process of an alternation block within such the apparatus.

An optical disk of being so-called a disc-like optical information recording medium, such as, DVD or the like, for example, is used widely as an information recording medium of being non-contact, a large memory capacity and a low cost, and also of enabling data access at high speed, for example, for the purpose of recording/reproducing digital audio data and/or digital video data, and further as an information recording medium for recording data of a personal computer.

In recent years, developments and researches are made actively, in particular, on the information recording medium, such as, DVD, etc., being characterized by high-density recording, and with such the information recording medium, i.e., the optical disk, there is defined an ECC (Error Correction Code) block by an assembly of a predetermined number of sector fields, for the purpose of securing a reliability of data recorded when recording the data on the recording surface thereof. However, in case when recording the data, which does not fulfill the ECC block, on such the information recording medium, readout to made on the ECC block, including a target sector field therein where the recording should be made, so as to substitute or alter write data from a host computer, for example, for the predetermined bytes of the target sector, and thereby recording them onto the original block, again. Such operation for recording is made by a unit of the sector field, and generally, it is called by "Read Modify Write".

On the other hand, differing from such the recording operation that is called by the "Read Modify Write" mentioned above, however, the following Patent Document 1, for example, discloses therein a technology for conducting reproduction of the data area or region after reproduction of the sectors within an alternation area or region, under the regulation or standard of Mt. Rainer. Also, the following Patent Document 2 discloses therein a technology for seeking into a sector within the alternation region, so as to reproduce the data corresponding to the defective sectors, after reproducing the sectors of the data requested, from the top to the end, including the defective sectors therein. Further, the following Patent Document 3 discloses therein a technology for reproducing data of the alternation sectors to be written into a buffer RAM when mounting a disk, and for reproducing thereof but skipping the sectors alternated or substituted when reproducing the data therefrom.

[Patent Document 1] Japanese Patent Laying-Open No. 2004-303345 (2004);

[Patent Document 2] Japanese Patent Laying-Open No. 2004-171603 (2004); and

[Patent Document 3] Japanese Patent No. 3254340

BRIEF SUMMARY OF THE INVENTION

However, those conventional arts mentioned above does not relate to, in particular, such the special recording operation as was mentioned above, onto the information recording medium, such as, the DVD or the like, for example, which enables high-density recording thereon; i.e., a method of utilizing the alternation sectors for use of "Read Error" when conducting the "Read Modify Write", and for that reason, with such the conventional arts, it is impossible to obtain a high speed in reproducing process of the alternation block, for enabling such the special recording operation, i.e., the "Read Modify Write".

Then, according to the present invention, for dissolving such the drawbacks in the conventional arts as Was mentioned above, it is an object thereof to provide a technology for achieving a high-speed reproducing process of the alternation block, in particular, when the "Read Error" occurs during the "Read Modify Write" operation; i.e., an information recording/reproducing apparatus and a data reproducing method, for enabling to conduct the alternating or substituting process of the defective sectors within the recording operation, which is called by the "Read Modify Write", at a high speed, as well as, an optical disk for that.

For accomplishing the object mentioned above, according to the present invention, firstly there is provided an information recording/reproducing apparatus, comprising: a spindle motor for rotationally driving an optical disk of rewritable type, at a predetermined speed; an information recording portion for recording information, through irradiating a laser beam upon an information recording surface of said optical disk of rewritable type, which is rotationally driven by said spindle motor; an information reproducing portion for reproducing the information upon the information recording surface on said optical disk of rewritable type, through reflection light of the laser beam reflected upon the information recording surface thereof; and a controller portion for controlling operation in each of the portions mentioned above; wherein said optical disk of rewritable type comprises an alternated block management area, a data area, on which recording/reproducing of the information is conducted by a unit of block, and an alternation area, on which recording/reproducing of information including a defective sector therein is conducted by the unit of block, and said information recording/reproducing apparatus further comprises a portion, which executes reproducing on said alternation area, so as to hold data reproduced, after executing reproducing on said data area including the defective sector therein, by only one (1) time, thereby reproducing the data, in case where said alternation areas are in a plural number thereof when executing Read Modify Write operation onto said optical disk of rewritable type.

Further, according to the present invention, the information recording/reproducing apparatus as described in the above, preferably, further comprises a portion, which executes the reproducing on said alternation areas, upon basis of information of the alternated block management area on said optical disk of rewritable type, or preferably, further comprises a memory device, which memorizes therein data of the sector succeeding the reproducing thereof, when reproducing said data area including the defective sector therein.

Also, according to the present invention, also for accomplishing the object mentioned above there is provided a data reproducing method for reproducing data, upon an optical disk of rewritable type, having an alternated block management area, a data area, on which recording/reproducing of the information is conducted by a unit of block, and an alternation area, on which recording/reproducing of information including a defective sector therein is conducted by the unit of block, through an information recording/reproducing apparatus enabling to execute Read Modify Write operation thereon, comprising the following steps of, in case where said alternation areas are in a plural number thereof when executing Read Modify Write operation onto said optical disk of rewritable type: executing reproducing on said data area including the defective sector therein, by only one (1) time; executing reproducing on said alternation area, thereafter, so as to hold data reproduced; and thereby reproducing the data.

Further, according to the present invention, within the data reproducing method for reproducing data described in the above, preferably, the reproducing is executed upon the alternation areas, upon basis of the information of the alternated block management area on said optical disk of rewritable type, or preferably, data of the sector succeeding the reproducing thereof is memorized within a memory device, when reproducing said data area including the defective sector therein.

In addition thereto, according to the present invention, is also for accomplishing the object mentioned above, there is further provided an optical disk of rewritable type, comprises: an alternated block management area; a data area, on which recording/reproducing of the information is conducted by a unit of block; and an alternation area, on which recording/reproducing of information including a defective sector therein is conducted by the unit of block, wherein data of an alternation target is recorded within said alternated block management area, and an address of a pre-alternation block is recorded within said alternation area.

Further according to the present invention, within the optical disk described in the above, preferably, said alternation area includes information by the unit of sector to be altered, which includes said defective sector therein, and further information of validity or invalidity by the unit of sector, of the information including said defective sector, and information of a pre-alternation block address thereof, or preferably, said alternated block management area, said data area, and said alternation area of said optical disk of rewritable type are disposed, separating from one another, upon a disc-like surface of a medium thereof.

BRIEF DESCRIPTION OF THE SEVERAL VIEWS OF THE DRAWING

Those and other objects, features and advantages of the present invention will become more readily apparent from the following detailed description when taken in conjunction with the accompanying drawings wherein.

DETAILED DESCRIPTION OF THE INVENTION

Hereinafter, embodiments according to the present invention will be fully explained by referring to the attached drawings.

Figure 1:
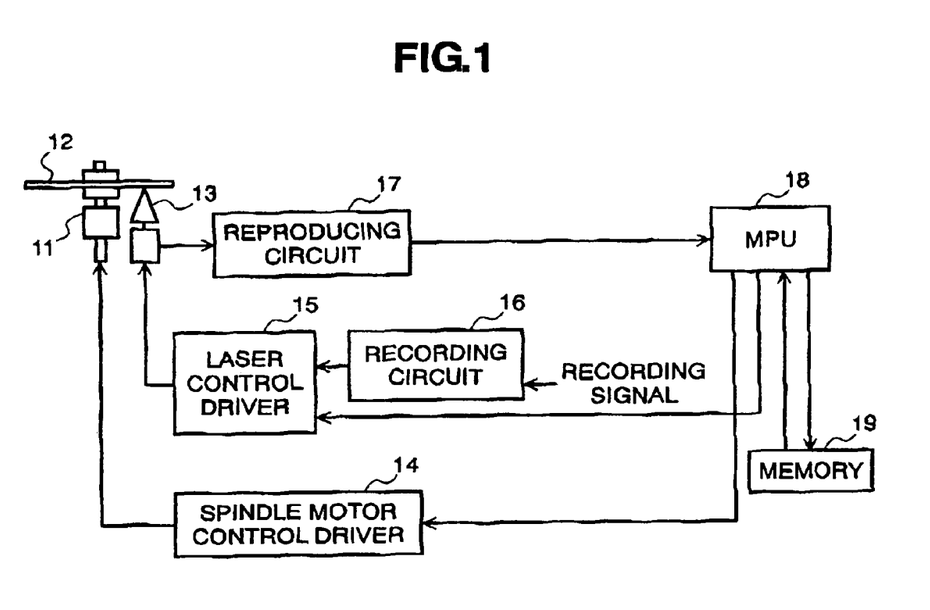
FIG. 1 is a block diagram for showing an outline structure of an information recording/reproducing apparatus, according to an embodiment of the present invention.

First of all, FIG. 1 shows the entire structures of an information recording/reproducing apparatus, according to an embodiment of the present invention.

In this FIG. 1, a reference numeral 11 depicts a spindle motor, and at a tip of a rotation shaft of this spindle motor 11 is mounted an optical disk 12, being a disc-like optical information recording medium, for example, by means of a holding member, but not shown in the figure, thereby being rotationally driven at a predetermined rotation speed. On the other hand, facing to the information recording surface (i.e., the lower surface in the figure) of the optical disk 12, which is rotationally driven at the predetermined rotation speed in this manner, an optical pickup 13 is provided in a movable manner into the radial direction of the disk, and therefore, although not shown in the figure, the optical pickup 13 irradiates a laser beam generated from a light source such as, a semiconductor laser, for example, which is provided in an inside thereof, upon the information recording surface of the optical disk through an optic system, including an objective lens therein, and further it receives a reflection light thereof, thereby conducting so-called a focusing operation and/or a tracking operation, as well as recording or reproducing a test signal and/or an actual recording signal.

Also, a reference numeral 14 in the figure depicts so-called a driver circuit for use of controlling the spindle motor, for supplying driving current to the spindle motor 11 mentioned above. In this embodiment, it enables controlling, for example, a quad-speed (4×) and a six-speed (6×). Also, a reference numeral 15 in the figure depicts a driver circuit for use of controlling the laser, for supplying driving current to the semiconductor later, which builds up the light source of the optical pickup 13 mentioned above. Further, into this driver circuit 15 for use of controlling the laser are provided or inputted a control signal from a microcomputer 18, which will be mentioned below, and also a recording control signal from a recording circuit 16, which processes the test signal and/or the actual recording signal from an outside (though not shown in the figure, from a host computer (hereinafter, only by "host"), etc., for example), thereby controlling the recording thereof.

On the other hand, an electric signal, which is detected and outputted by the optical pickup 13 mentioned above, is conducted with a predetermined reproducing process within a reproducing circuit 17, and thereby being reproduced into a desired signal (for example, digital data), to be outputted into an outside of the apparatus, for example. In addition thereto, as a control unit for controlling the optical disk apparatus, which comprises such the structures as was mentioned above, there is provided so-called a microcomputer (i.e., a MPU) 18, and this control unit 18 including the microcomputer therein inputs various kinds of signals therein, through the reproducing circuit 17 mentioned above, and thereby outputting control signals to the driver circuit 14 for use of controlling the spindle motor and further the recording circuit 16 mentioned above, in addition to the driver circuit 15 for use of controlling the laser. Also, this microcomputer 18 is equipped with a memory, such as, an EP-ROM or a Flash-ROM 19, etc., to be a memory device thereof.

However, with such the information recording/reproducing apparatus including the structures as mentioned above, for a person skilled in the art, it is of course that various kinds of operations can be made therein, including recording and reproducing operations of information, upon/from the information recording medium, such as, the DVD or the like, for example, being characterized by the high-density recording, through already-known functions and operations thereof.

Next, detailed explanation will be made on the operations when conducting the "Read Modify Write" operation, to be executed within the information recording/reproducing apparatus, an example of the structures of which was mentioned in the above, by referring to FIGS. 2 to 7 attached herewith.

Figure 2:
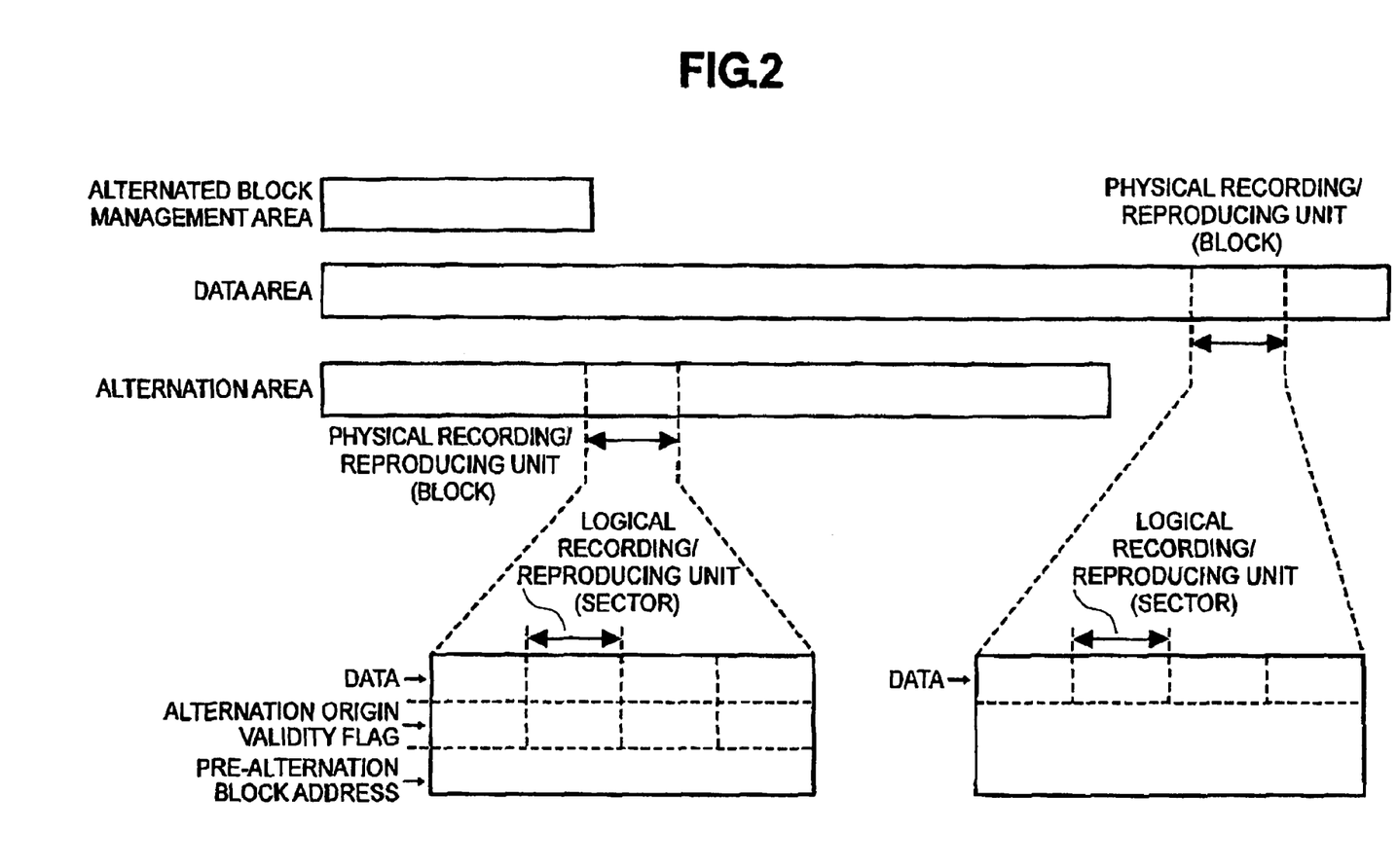
FIG. 2 is a view for showing an example of data structures of an information recording medium, upon which the "Read Modify Write" is executed by the information recording/reproducing apparatus, according to the present invention.
Figure 3:
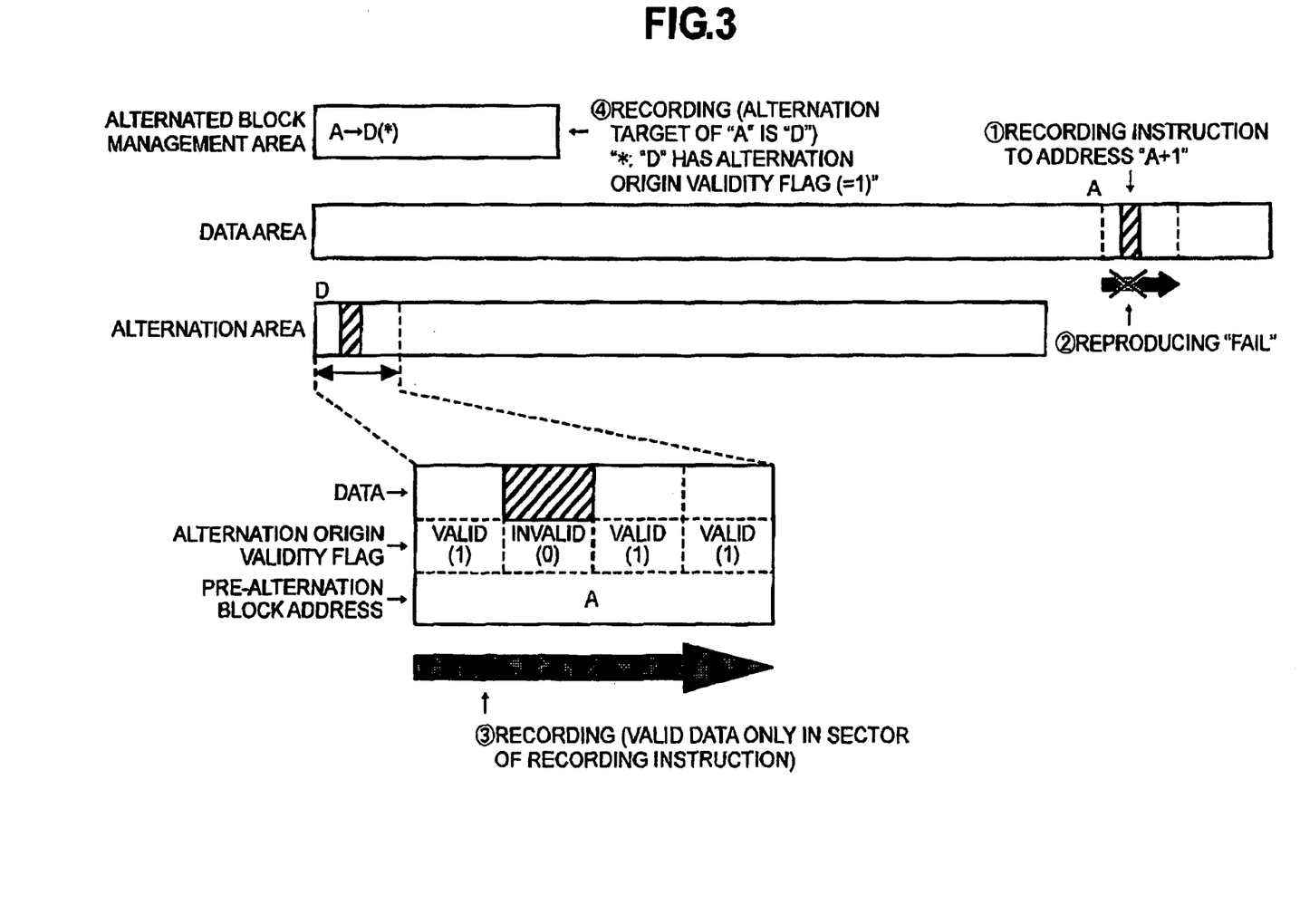
FIG. 3 is a view for explaining the condition when recording is a sector (in case where reproduction is unable) during the "Read Modify Write" operation, on the information recording medium mentioned above.

First of all, FIG. 2 shows an example of data structures on the information recording medium of high-density recording, upon which the "Read Modify Write" is executed by means of the information recording/reproducing apparatus according to the present invention. As is apparent from this figure, this information recording medium is built up with the following regions or areas, for example; i.e., an alternated block management area, a data area where a user writes desired data therein, and an alternation area for a defective sector, one by One, from an inner periphery side of that disc-like disk. However, those areas or regions should not be always limited into such an arrangement as was mentioned above, but they may be constructed into other structures.

However, the data area mentioned above is made up or constructed with in general, a physical unit for recording/reproducing on the disk, i.e., so-called a block, and further, each the block is constructed with a logical recording/reproducing unit. i.e., so-called a sector. Further, within the information recording/reproducing apparatus for the DVD or the like, recording/reproducing of the information is conducted by, normally, a unit of the block, i.e., the physical recording/reproducing unit. On the other hand, within the system using such the information recording/reproducing apparatus therein (such as, an information processing system equipped with a computer, for example), information provided from the host is recorded/reproduced by a unit of the sector, i.e., the logical recording/reproducing unit. Thus, the unit of recording/reproducing (e.g., the block) on the recording/reproducing medium differs from that, i.e., the unit of logical access (e.g., the sector), which is issued from the host. And, within the alternation area for the defective block, the data including defects therein is also recorded or registered is in it, alternatively, but by a unit of the block.

Also, within the alternated block management area is/are recorded defective sector(s), and in case when the defect lies within a block in the data area, for example, recording is also made on the information, relating to the destination or target of alternation (hereinafter, "alternation target"), and further, relating to presence (i.e., "Yes"/"No") of a valid flag for the origin of alternation (hereinafter, "alternation origin validity flag"). And, within each of the blocks of the alternation area is written the data, by a unit of the sector, i.e., the logical recording/reproducing unit, and at the same time, there are also provided a flag indicative of virility/invalidity (or, effectiveness/ineffectiveness) of that data, and further a block address before the alternation (hereinafter, by a "pre-alternation block address"), by a unit of that sector.

Explanation will be made on the case where an abnormality is detected when reproducing the block, to which the sector belongs, within the recording operation conducted by a unit of the said sector due to a request of the "Read Modify Write" from the host, in particular, on the information recording/reproducing medium having such data structures as was mentioned above, by referring to FIG. 3 attached herewith. In case where an instruction of recording into an address "A+1" is issued from the host, and failure is made on reproduction of the block "A" within the "Read Modify Write" operation, for example, then the data provided by a unit of the sector from the host (however, assuming that the data other than the said sector has effective or valid data within the pre-alternation block) is recorded into the alternation area mentioned above. In that instance, within the alternated block management area on the recording/reproducing medium, there are registered this relationship and also a fact, that the valid data lies within the pre-alternation block. Thus, in the example shown in this figure, the alternation target for the block "A" is "D", and it is indicated that the validity flag of the alternation origin lieu within the "D", e.g., the alternation target, by means of a symbol "(*)". Namely, in the example of this figure, the validity/invalidity of the data at the alternation target for the block "A" is indicated by means of a flag of the origin of alternation (hereinafter, "alternation origin validity flag"), which is compose of "valid (1)" or "invalid (0)". And, "A" is recorded into the pre-alternation block address thereof.

Figure 4:
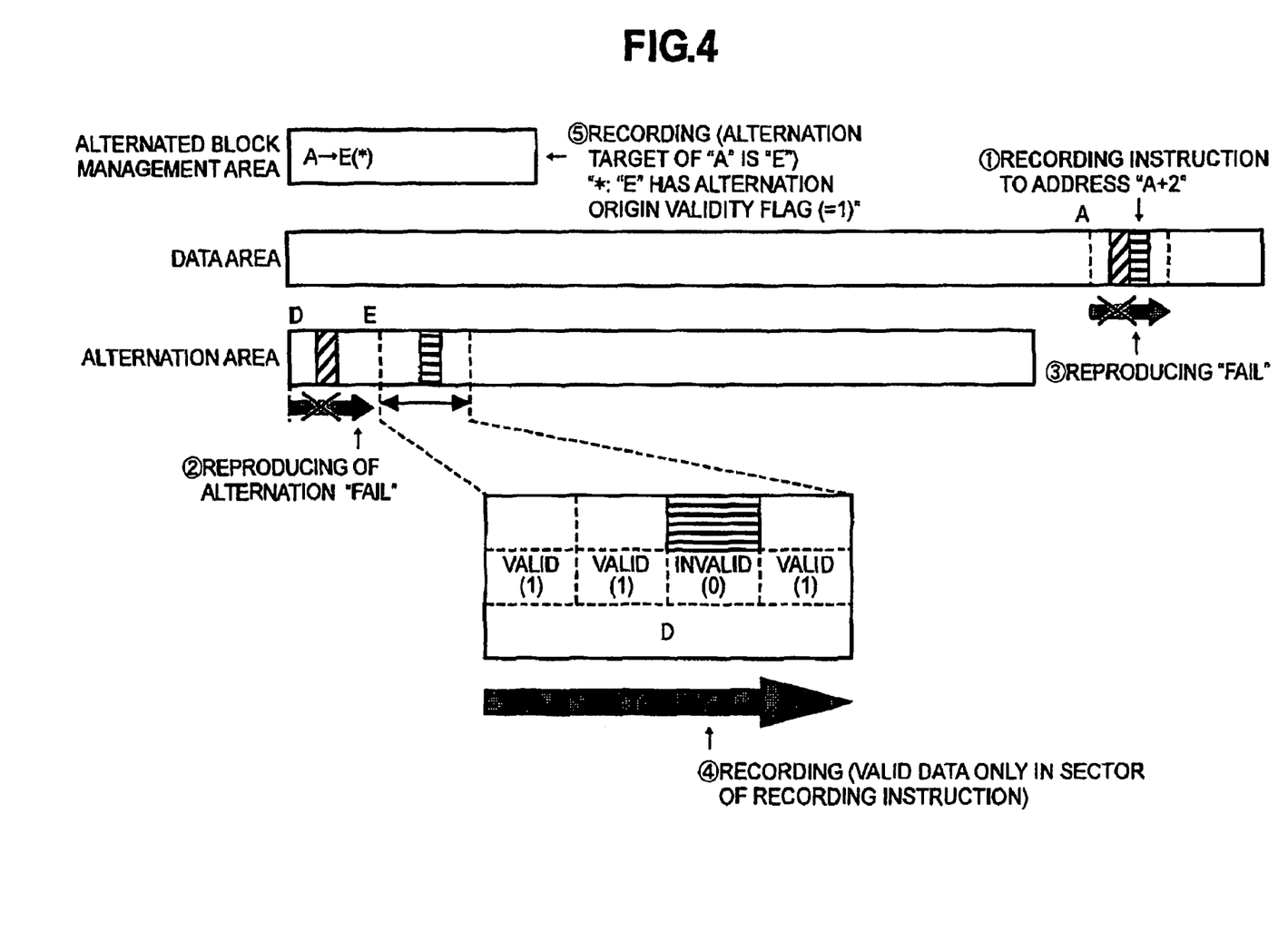
FIG. 4 is a view for explaining the condition when recording other sector (in case where reproduction is unable) during the "Read Modify Write" operation, on the information recording medium mentioned above.

Next, FIG. 4 shows a case where failure is made on reproduction thereof, in particular, when a further instruction is issued from the host to other sector (e.g., an address "A+2"), but within the same block mentioned above, under the condition shown in FIG. 3 mentioned above. Thus, in this case, as is shown in the figure, the alternation origin of the block "A" is "E", in the contents of the alternated block management area, and further it is indicated that the alternation origin validity flag lies within the alternation target, i.e., "E", by the symbol "(*)". And, within this alternation area, into the pre-alternation block address of the block "E" is recorded "A", i.e., the pre-alternation block address before that. In this manner, in case where both the plural number of addresses are irreproducible, the data of that sector is recorded into a new alternation block, and only the alternation origin and the final alternation target are registered into the alternated block management area.

In this manner, with the information recording medium having such the data structures as was mentioned above, if not reproducing the blocks of the alternation targets, one by one, it comes into the condition that it is unclear of the blocks, where the effective or valid data lies therein.

Figure 5:
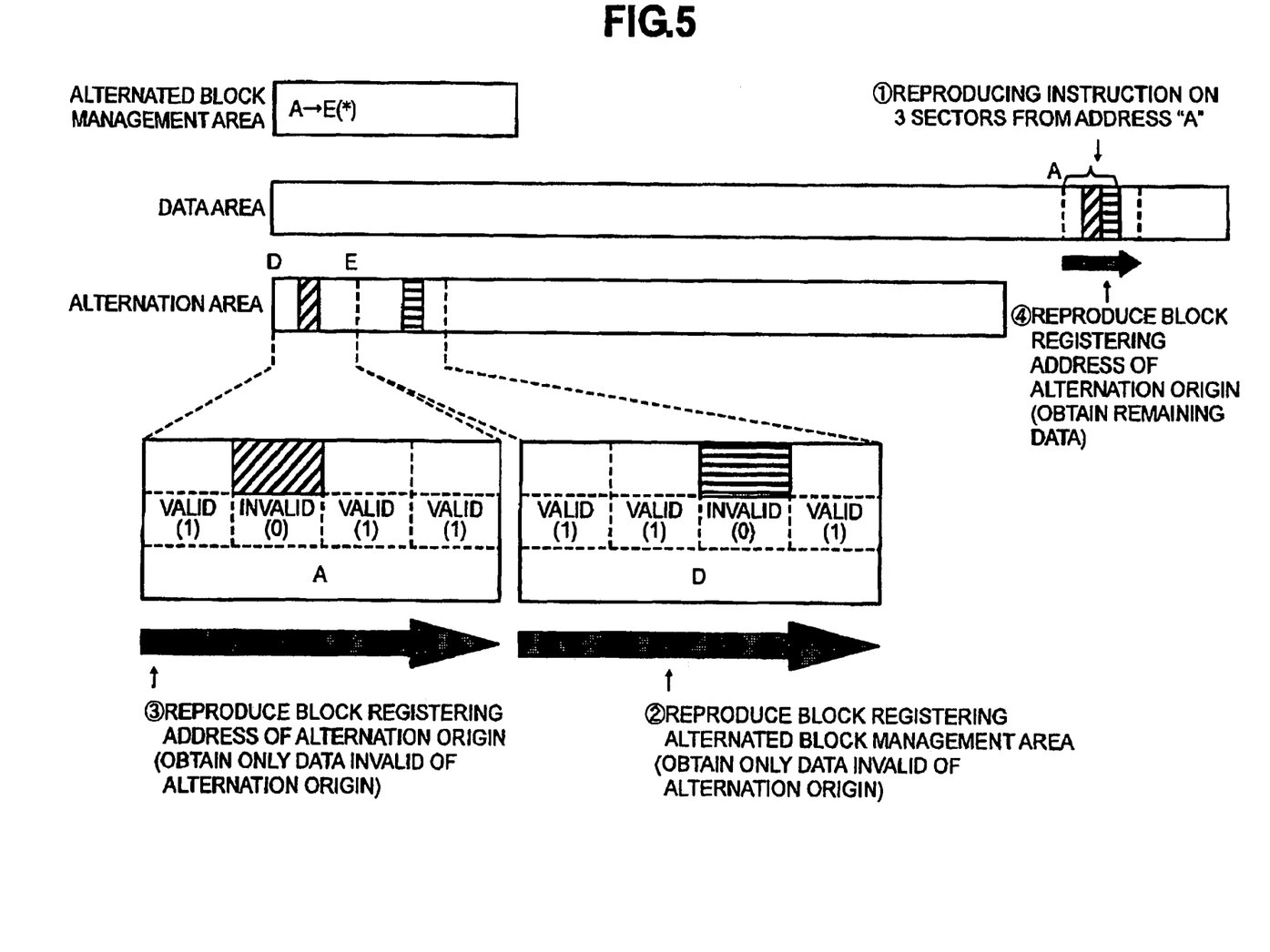
FIG. 5 is a view for explaining the condition when reproducing the sector during the "Read Modify Write" operation, on the information recording medium mentioned above.

On the other hand, reproducing processes is shown in FIG. 5, in particular, when an instruction for reproducing is made, alone, from the host onto that block, with the information recording medium having such the data structures as was mentioned above. For example, in case when an instruction is made from the host, for reproducing three (3) sectors starting from the address "A", is then, first reproduction is made on the block "E" within the alternation area, judging from or due to the contents of the alternated block management area; i.e., "A→E(*)", thereby obtaining only the data, the alternation origin validity flag of which is valid (=0). Following to that, reproduction is made on the block "D" within the alternation area, due to the contents of the pre-alternation block address (i.e., "D"). Herein, also in the similar manner, only the data, the alternation origin validity flag of which is invalid (=0), is obtained. However, in this instance, since the content of the pre-alternation block address is "A", then remaining data is obtained while turning back to the address "A" within the data area. With doing this, it is possible to obtain the data, which is instructed from the host.

Figure 6:
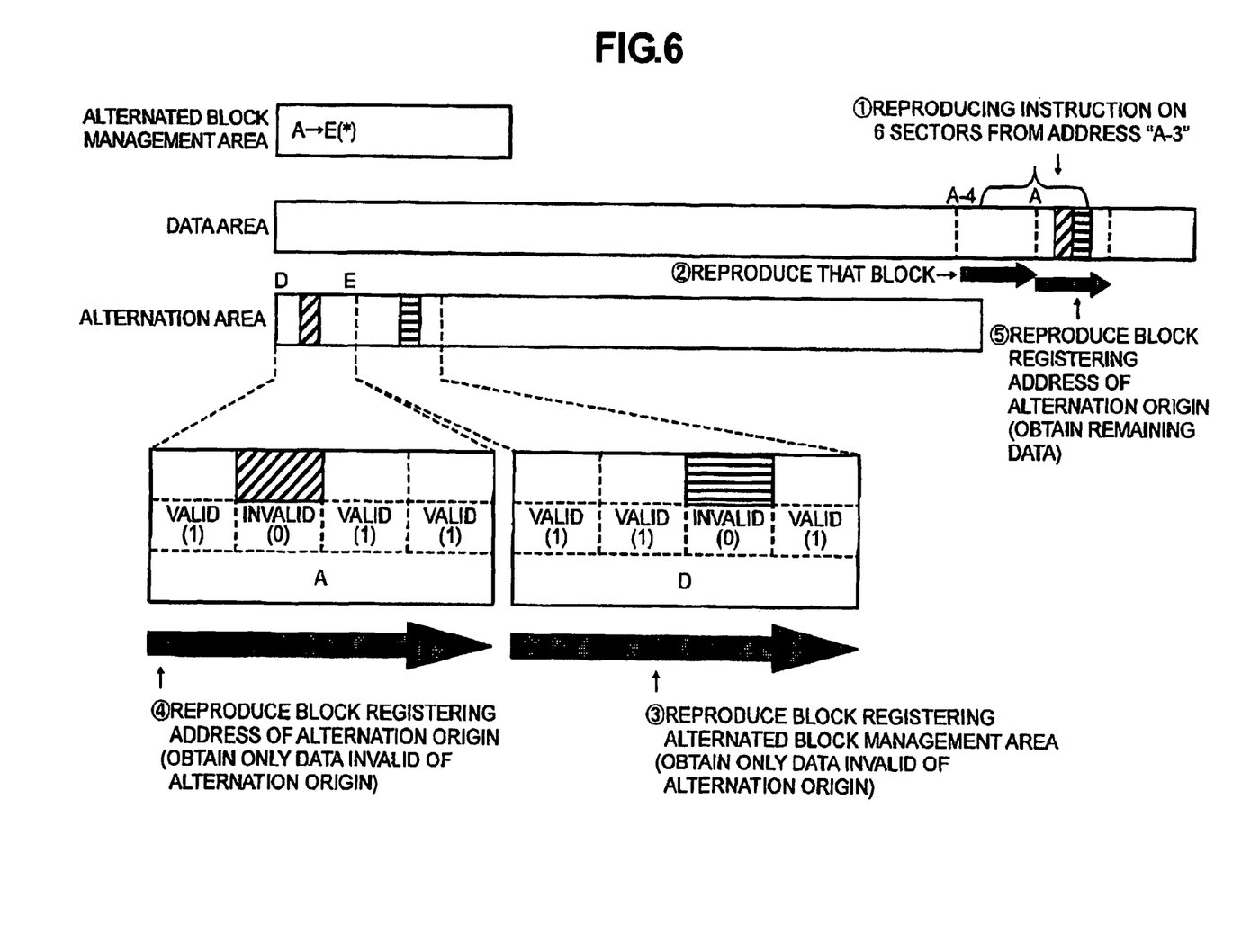
FIG. 6 is a view for explaining the condition when reproducing the sector during the "Read Modify Write" operation, but in accordance with a general sequential reproduction, on the information recording medium mentioned above.

Next, by referring to FIG. 6 attached herewith, explanation will be made on the operations, in particular, in the case when an instruction is made for reproducing the blocks, continuously, from the block prior to that shown in FIG. 5 mentioned above (such as, reproducing six (6) sectors, continuously, from an address "A−3", for example). In this case, also similar to that shown in FIG. 5 mentioned above, herein reproducing of the data area is (or must be) achieved while dividing it into plural numbers of times (such as, two (2) times in this example), in a manner like "reproduce data area→reproduce alternation area→reproduce data area, again", for example. And, this means, in particular, for the information recording medium, disposing the data area and the alternation separating from each other in the data structures thereof, that it takes a long time for the optical pickup, which is provided on a side of the apparatus for conducting recording/reproducing, to move into the radial direction of the disk, and therefore it delays the reproducing time therein.

Figure 7:
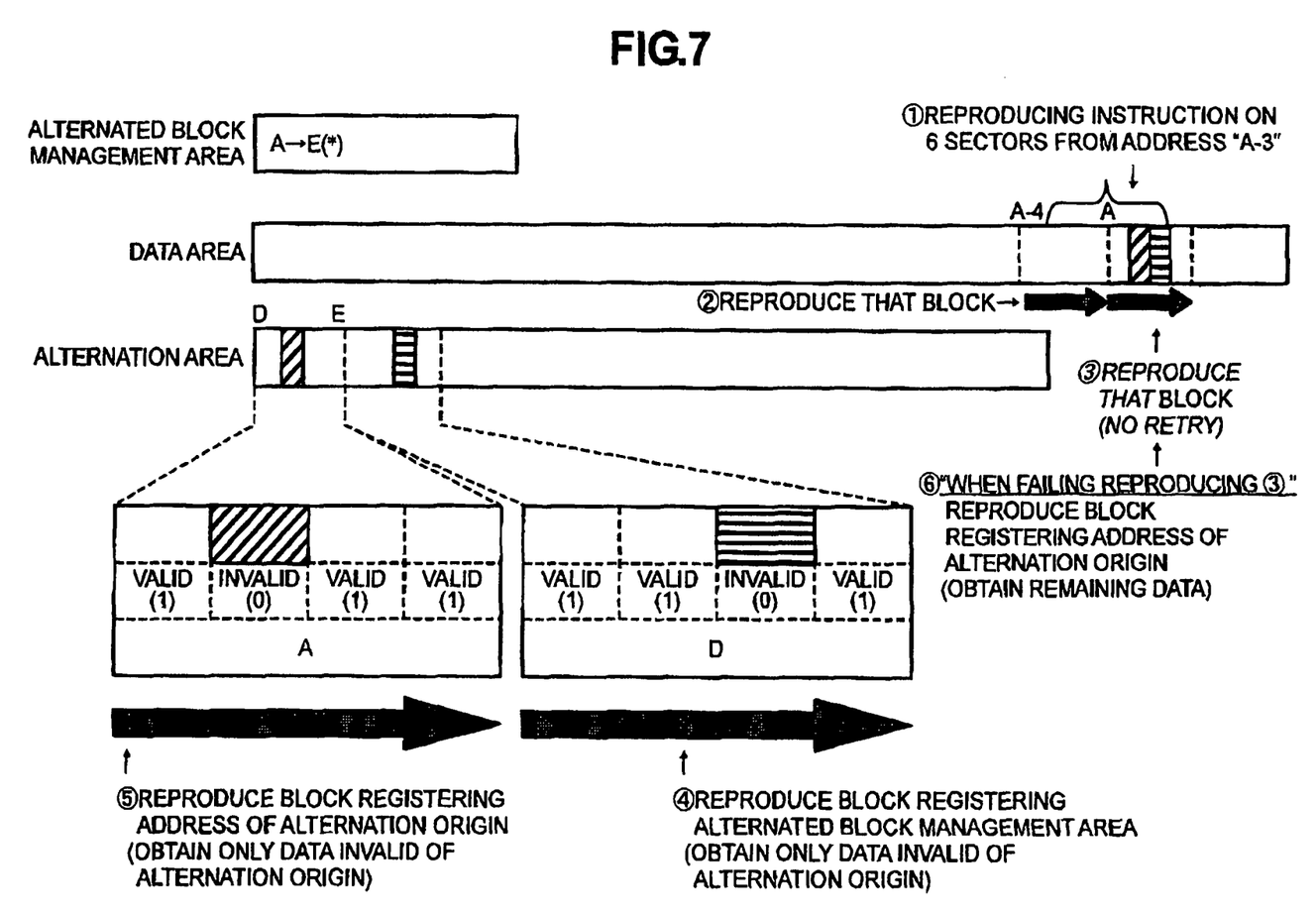
FIG. 7 is a view for explaining the condition when reproducing the sector during the "Read Modify Write" operation, in accordance with a sequential reproduction of the present invention, on the information recording medium mentioned above.

Then, according to the present invention, as is shown in FIG. 7 attached herewith, in case where an instruction is made for reproducing the blocks, continuously, from the block prior to that shown in FIG. 5 mentioned above (for example, reproducing six (6) sectors, continuously, from an address "A−3"), and in particular, where an effective or valid data of address of other alternation area lies within the pre-alternation block address in the blocks within that alternation area (for example, also the alternation area "D" lies within the pre-alternation block address of the block "E" in the alternation area), then reproducing is made upon the block of the alternation origin within the data area (see "A" in the figure), at the same time when reproducing the previous block (see "A−4" in the figure), once, and thereafter, reproducing is made on the blocks of the alternation target within the alternation area (see "D" and IBM in the figure). With doing this, there is no necessity of reproducing the block within the data area after reproducing the block in the alternation area, again, as is shown in FIG. 5 mentioned above (in more details, there is no necessity of conducting the reproduction upon the block within the data area, after reproducing the alternation area, "E" and "D" in FIG. 5), thus, it is not necessary to conduct the block reproduction within the data area, repetitively. With this, it is possible to deal with a case where the data is necessary of the block of the alternation origin within the data area, as quickly as possible, and at the same time, it is possible to shorten the time, for the optical pickup, being provided on the side of the apparatus for conducting recording/reproducing, to move into the radial direction of the disk, and thereby enabling to increase speed (i.e., speedup) in the reproducing time thereof, in total.

However, the blocks (i.e., "D" and "E" in the example shown in the figure) are registered alternatively (or, substituted), originally, since they are failed in the reproduction thereof, and further, there is also a possibility that no valid data lies therein. Therefore, it is preferable, for the apparatus side of conducting the recording/reproducing, not to execute a retrying process when it falls the reproduction thereof, at this timing. But, on the said blocks, it is enough to execute the retrying process, only after deciding that there is the valid data thereof.

As was mentioned in details in the above, with the information recording medium having such the data structures as was mentioned above, the necessity comes to be clear, in particular, for reproducing the block(s) within the data area, i.e., the alternation origin thereof, when reproducing the block(s), which are registered alternatively or substituted, and in more details thereof, depending upon the contents within the alternated block management area mentioned above. And, in that instance, in particular, in a case where the reproduction be made from the previous block, continuously, it is necessary to reproduce the data area, diving it into plural numbers of times and therefore, there is a drawback of taking a long time. Then, according to the present invention, avoiding such the plural numbers of times of reproducing operations within such the data area, and also, avoiding the time for retrying within the reproducing operation, in particular, on the portion(s) where the possibility of failure is high in the reproducing thereof, since the said blocks are registered alternatively, thereby removing unnecessary times therefrom.

Following to the above, detailed explanation will be made on the operations when conducting the "Read Modify Write" operation within the information recording/reproducing apparatus for conducting reproducing/reproducing of information, in particular, onto the information recording medium, such as, DVD or the like, being characterized by the high-density recording, upon basis of a principle of operation, according to the present invention, the details of which are mentioned above, by referring to a flowchart shown in FIG. 8 attached herewith.

Figure 8:
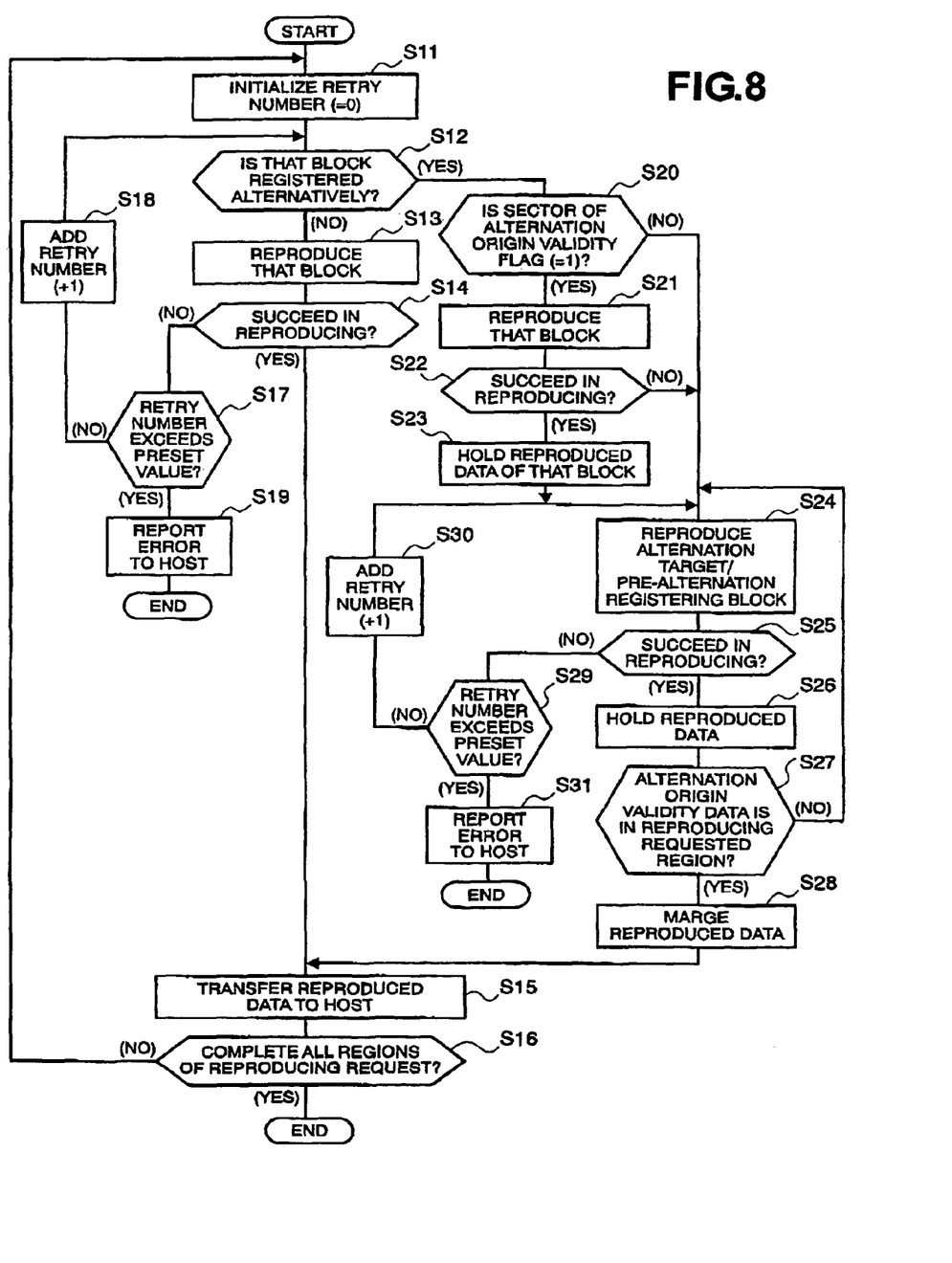
FIG. 8 is a flowchart for explaining the operations of the information recording/reproducing apparatus, for executing a sector reproduction, in accordance with the sequential reproductions of the present invention.

However, the operation, which will be explained below, is booted or started up, upon the "Read Modify Write" from the host, for example, and is executed by the microcomputer (MPU) 18 shown in FIG. 1 mentioned above. And, as is apparent from the figure, firstly, initialization is made on a number of times (=0) of retying for the reproducing operations (S11). Following to the above, determination is made on whether the block to be reproduced is the block or not, which is registered alternatively (S12). However, in that instance, the determination may be made upon basis of the information of the alternated block management area within the data structures of the information recording medium, which is shown in FIG. 2 mentioned above.

As a result of the determination in the step S12 mentioned above, in case when it is determined that the said block is not that, which is registered alternatively ("NO"), reproducing is conducted upon that block (S13). Thereafter, determination is made on whether the reproducing is succeeded or not on that block (S14), and in case where the reproducing is made in success ("YES") as the result thereof, then data reproduced is transferred to the host (S15). And those operations mentioned above will be repeated until when they complete all over the areas, upon which the reproducing request is made from the host (S16). But, in case when determining that the reproducing i.e. in failure ("NO") in that step S14 mentioned above, then the retrying will be conducted, but in that instance, determination is made on whether the number of retying exceeds or not, over a predetermined number (S17), and in the case where it does not exceed that predetermined number, the process turns back to the step S12 mentioned above, but after adding the retrying number by only one (1) (S18), and hereby executing a series of the reproducing operations mentioned above. On the other hand, in case when the retying number exceeds the predetermined number, an error is reported to the host (S19), and thereby completing the series of the operations. However, those operations mentioned above are common ones for the information recording/reproducing apparatus, which conducts such the recording/reproducing of information.

And, according to the present invention, in case when the block to be reproduced is determined to be the defective one ("YES"), which is registered alternatively, within the step S12 mentioned is above, then determination is made on if there is a sector or not, the alternation origin validity flag is valid (=1) (S20). Thus, as was mentioned above, in the example shown in the above, it is confirmed that the alternation block (for example, "D" or "E") is followed by the mark (*), within the information which is recorded in the alternated block management area on the information recording medium. As a result of that, in case when determining that there is the sector ("YES"), being valid (=1) in the alternation origin validity flag thereof, reproduction is made on the said block to be reproduced (S21), and then it to determined on whether the reproduction is succeeded or not (S22). As a result of this, in case where the reproduction is succeeded ("YES"), the reproduced data of that block is held, for example, within the memory (S23), and following to this, the process is moved into reproduction of alternation target/pre-alternation register block (S24). The movement into this step S23, is conducted, also in case when determination is made that there is no sector ("NO"), being valid (=1) in the alternation origin validity flag thereof, in the step S20 mentioned above, and further in case when the reproduction is failed on the block to be reproduced ("NO"), in the step S22 mentioned above.

Thus, as was mentioned above, it comes to be clear that the reproduction is necessary upon the block within the data area, i.e., the alternation origin, from the information recorded within the alternated block management area on the information recording medium (i.e., "YES" in the step S20 mentioned above). And, in that case, for the purpose of avoiding the necessity of reproducing this area while dividing it into plural numbers of times, the production is made only one (1) time. And, that data, which is succeeded in reproduction thereof, once, is hold within the memory, for example, to be used in the necessary processes thereafter. Also, in the reproducing of the block including the sector, being valid (=1) in the alternation origin validity flag thereof, in the step S21 mentioned above, because of high possibility of failure is in reproduction, it is determined that no retrying of reproducing operation will be made on that portion (i.e., "NO" in the step S22 mentioned above).

On the other hands within the reproducing operation in the step S24 mentioned above, as was mentioned above, reproduction is executed upon the block ("E" in the example shown in FIG. 7 mentioned above) of the alternation target, which is recorded within the alternated block management area, and further upon the block ("D" in the example shown in FIG. 7 mentioned above) of the pre-alternation block address of the alternation area block "E", but depending upon the necessity thereof. In more details thereof, firstly reproduction is made on the alternation target block, and thereafter, determination is made on whether that reproduction is succeeded or not (S25). As a result thereof, in case when the reproduction is succeeded ("YES"), the reproduced data succeeded in the reproduction is also held within the memory device (S26). Thereafter, determination is made on if there is a sector or not, the valid data of which lies within the alternation origin, within a region of the reproducing request or instruction (S27). However, in the example mentioned above, since "D" is recorded into the pre-alternation block address of the alternation target block "E" within the reproduced alternation area, and the valid data of the alternation origin (A) is not within the requested region ("NO"), then the process turns back to the reproducing operation of the step S24 mentioned above, to reproduce the alternation area block "D", i.e., repeating the operations mentioned above. As a result thereof, in case when determining that the valid data of the alternation origin lies within the requested region ("YES"), the reproduced data is merged (i.e., being recomposed into the correct data) upon basis of the data (S28), which is reproduced and held within the memory, and thereafter, the reproduced data is transferred into the host, while shifting into the step S15 mentioned above.

However, in case where the reproduction is failed ("NO") in the step S25 mentioned above, the retying is repeated, through steps S20 and S30, by the number of times, which is determined by the predetermined value thereof, and but it still fails in the reproduction thereof ("NO") an error is reported to the host (S31), and thereby completing the series of the operations.

Thus, according to the operations of the information recording/reproducing apparatus, in particular, when it is in the "Read Modify Write" operation, the reproduction is made upon the data area of the alternation origin and the block (A), being necessary for producing the data, but only one (1) time, from the information recorded within the alternated block management area on the information recording medium, and that data reproduced is held within the memory. Thereafter, reproduction is made on the block "E" and/or "D" of the alternation area, to reproduce the original correct data thereof. In that instance, in particular, although reproduction is made on the block "D" within the contents of the pre-alternation block address thereof, however, in that instance, the data held within the memory is used, but not turning back to the data area "A" of the alternation origin, and thereby obtaining the data, which is instructed from the host. For that reason, it is not necessary to conduct the reproduction upon the blocks of the data area, by the plural numbers of times, and this shorten the time for the optical pickup provided on the side of the apparatus for conducing the recording/reproducing, to move into the radial direction of the disk; thereby enabling to increase the speed (i.e., speedup), in the reproducing time thereof, in total.

As was fully mentioned above, according to the present invention, there can be achieve superior effects of providing a technology for achieving a high-speed reproducing process of the alternation block, in particular, when the "Read Error" occurs during the "Read Modify Write" operation; i.e., an information recording/reproducing apparatus and a data reproducing method, for enabling to conduct the alternating or substituting process is of the defective sectors within the recording operation, which is called by the "Read Modify Write", at a high speed, as well as, an optical disk for that.

The present invention may be embodied in other specific forms without departing from the spirit or essential feature or characteristics thereof. The present embodiment(s) is/are therefore to be considered in all respects as illustrative and not restrictive, the scope of the invention being indicated by the appended claims rather than by the forgoing description and range of equivalency of the claims are therefore to be embraces therein.

What is claimed is:

1. An information recording/reproducing apparatus, comprising:
   a spindle motor for rotationally driving an optical disk of rewritable type, at a predetermined speed;
   an information recording portion for recording information, through irradiating a laser beam upon an information recording surface of said optical disk of rewritable type, which is rotationally driven by said spindle motor;

an information reproducing portion for reproducing the information upon the information recording surface on said optical disk of rewritable type, through reflection light of the laser beam reflected upon the information recording surface thereof;

a memory device for storing information;

a controller portion for controlling operation in each of the portions mentioned above;

wherein said optical disk of rewritable type comprises a data area, on which recording/reproducing of the information is conducted by a unit of block comprising a plurality of sectors, an alternation area, on which recording of information about a defective sector in a block is conducted alternately, and a management area in which management information is recorded, said management information including an address of said block having said defective sector therein and an address of an alternation area corresponding to said block, wherein the information is recorded in said alternation area, wherein said management information indicates validity or invalidity of information in said block, wherein when a first block and a second block adjacent to said first block are to be reproduced, and (1) said second block is a last correctable area in said reproducing area of said optical disk and (2) said management information in said management area indicates that said second block includes a defective sector, then said controller portion:

reproduces said first block;

reproduces said second block and store information resulting therefrom into said memory device;

reproduces information stored in said alternation area corresponding to said second block; and reproduces a combination of information from said second block and information from said alternation area.

2. The information recording/reproducing apparatus, as described in the claim 1, configured to execute a read-write-modify operation, wherein when the first block and the second block are to be subject to the read-write-modify operation, then said controller portion:

reproduces said first block reproduces said second block and store information resulting therefrom into said memory device;

reproduces information stored in said alternation area corresponding to said second block; and reproduces a combination of information from said second block and information from said alternation area.

3. The information recording/reproducing apparatus, as described in the claim 1, wherein said controller portion reproduces a block having a defective section, information contained in said defective sector is stored in said memory device.

4. The information recording/reproducing apparatus, as described in the claim 1, configured to record/reproduce on said optical disc, wherein said management area, said data area, and said alternation area of said optical disc of rewritable type are disposed, separated from one another, upon a disc-like surface of a medium.

5. An information reproducing apparatus comprising:

a spindle motor for rotationally driving an optical disc of rewritable type at a predetermined speed;

an information reproducing portion for reproducing the information upon the information recording surface on said optical disk through reflected light of a laser beam incident upon said information recording surface;

a memory device for storing information; and a controller portion, wherein said optical disk of rewritable type comprises a data area, on which recording/reproducing of the information is conducted by a unit of block comprising a plurality of sectors, an alternation area on which recording of information about a defective sector in a block is conducted alternately, and a management area in which management information is recorded, said management information including an address of said block having said defective sector therein and an address of an alternation area corresponding to said block, wherein the information is recorded in said alternation area, wherein said management information indicates validity or invalidity of information in said block, wherein when a first block and a second block adjacent to said first block are to be reproduced, and (1) said second block is a last correctable area in said reproducing area of said optical disk and (2) said management information in said management area indicates that said second block includes a defective sector, then said controller portion:

reproduces said first block;

reproduces said second block and store information resulting therefrom into said memory device;

reproduces information stored in said alternation area corresponding to said second block; and reproduces a combination of information from said second block and information from said alternation area.

* * * * *